E. A. SUTZ.
TRAFFIC SIGNAL.
APPLICATION FILED FEB. 12, 1920.
1,391,284.
Patented Sept. 20, 1921.
2 SHEETS—SHEET 1.
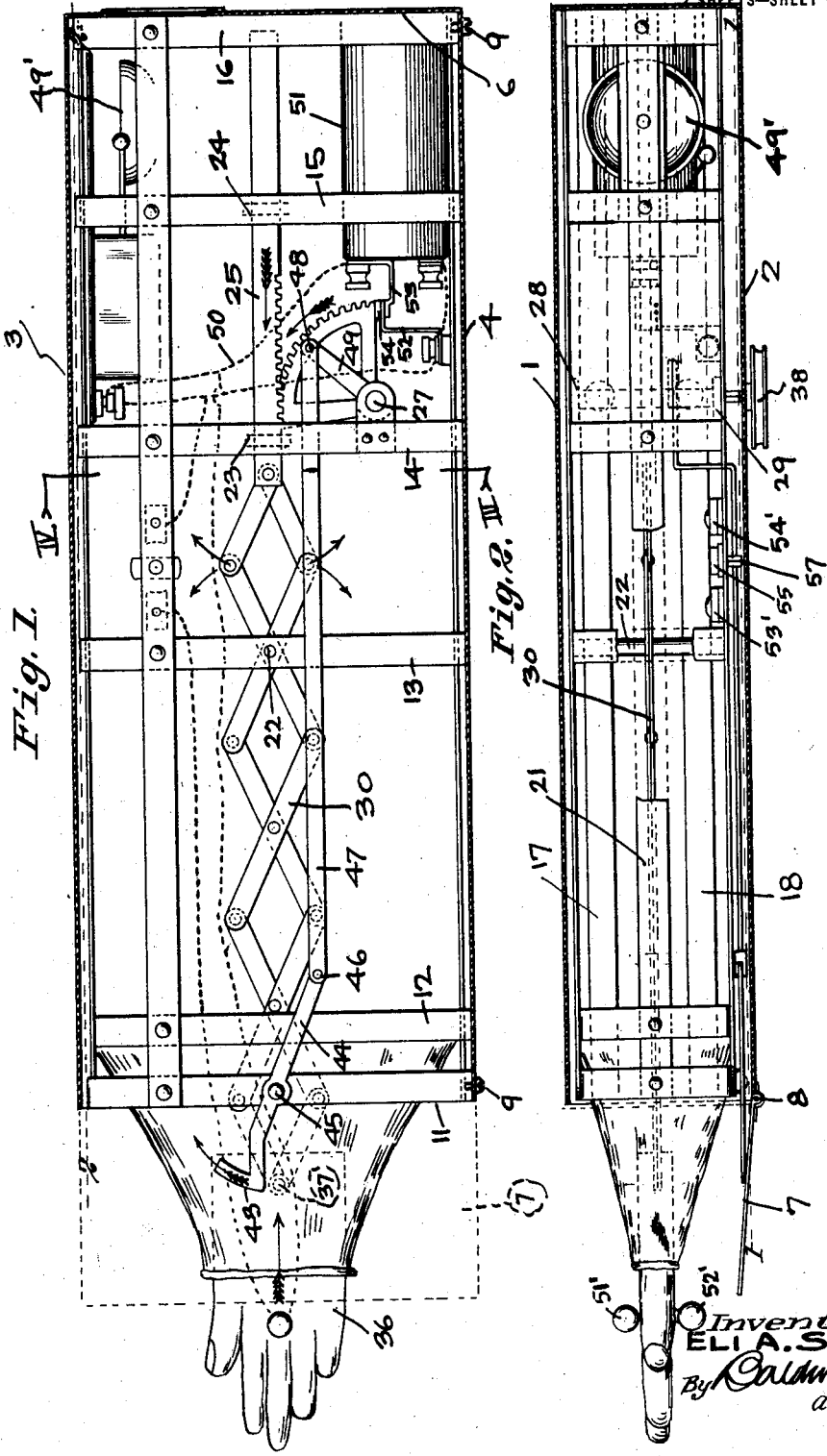

E. A. SUTZ.
TRAFFIC SIGNAL.
APPLICATION FILED FEB. 12, 1920.
1,391,284.
Patented Sept. 20, 1921.
2 SHEETS—SHEET 2.
Fig.3.
Fig.4.
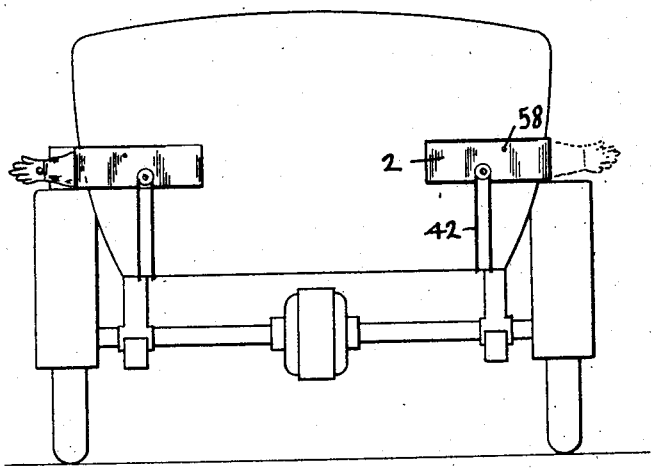
Fig.5.
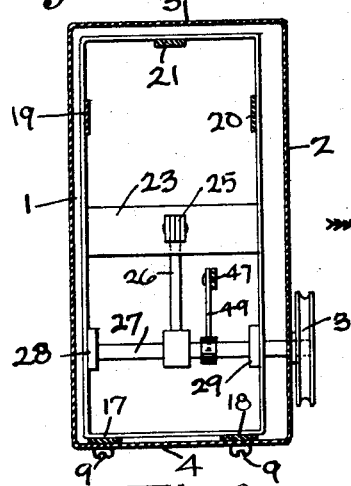
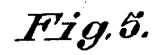
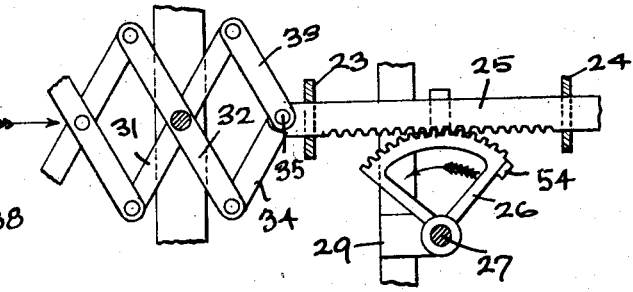
Fig.6.
Fig.7.
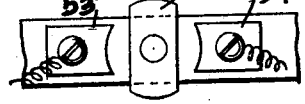
Fig.8.
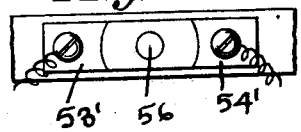
Fig.9.
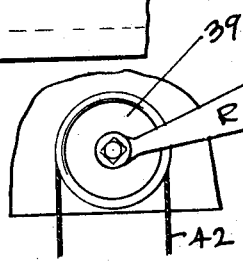
Inventor.
ELI A. SUTZ
By Baldwin Dale
Attorney.

UNITED STATES PATENT OFFICE.

ELI A. SUTZ, OF OAKLAND, CALIFORNIA.

TRAFFIC-SIGNAL.

1,391,284. Specification of Letters Patent. Patented Sept. 20, 1921.

Application filed February 12, 1920. Serial No. 358,033.

*To all whom it may concern:*

Be it known that I, ELI A. SUTZ, a citizen of the Republic of Roumania, and having received my first papers of citizenship in the United States, and a resident of the city of Oakland, county of Alameda, State of California, have made a new and useful invention—to wit, Improvements in Traffic-Signals; and I do hereby declare the following to be a full, clear, concise, and exact description of the same.

This invention relates to improvements in traffic signals, and more particularly to signals attachable to vehicles.

Among the objects of this invention are to provide a signal attachable to a vehicle and adapted to be operated by the driver to indicate his intention to depart from his course. The signals are preferably arranged in pairs, one on each side of the machine at the rear, in front or in any other desired positions according to the type of the vehicle. Another object is to provide a signal of distinctive type calculated to attract the immediate attention of those following the vehicle. For the purpose of insuring attention auditory alarm means are combined with the visible index. Other objects and advantages will appear as this description progresses.

In lieu of mechanical signals, it has been customary for the driver of motor vehicles to extend their hands beyond the side of the vehicle in accordance with a popular code to indicate the direction in which the vehicle is about to turn or come to a stop. This mode of signaling is now so popularly understood that I have sought in the present invention to imitate such signals by mechanical means.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings,

Figure 1. is a side view in longitudinal section of a traffic signal constructed in accordance with this invention, showing the index in an extended position.

Fig. 2. is a similar view from above of the same.

Fig. 3. is a diagrammatic end elevation of a motor vehicle, having this invention attached thereto.

Fig. 4. is an end view in cross section taken on the line IV, Fig. 1.

Fig. 5. is a fragmentary detail of the operative mechanism.

Fig. 6. is a fragmentary view from above of the end of the signal case.

Fig. 7. is a detail of the electric switch in the open position.

Fig. 8. is a similar view of the same in the closed position.

Fig. 9. is a fragmentary detail of the signal operating transmission mechanism.

In detail the construction illustrated in the drawings includes an inclosing box like casing comprising the sides 1 and 2, the top and bottom 3 and 4, the end 6 and the door 7, hinged at 8, with a spring hinge adapted to hold the door normally closed across the end of the casing for the protection of the index and operative mechanism while in the inoperative position. This casing is preferably constructed of sheet metal enameled or painted.

The signal mechanism is mounted in a skeleton frame work slidable into and out of the casing within which it is fixed by the screws 9—9 which permits the withdrawal of the operative mechanism for the purpose of inspection or repair. This frame comprises a series of rectangular bands 11, 12, 13, 14, 15 and 16 joined by the strips 17, 18, 19, 20 and 21 riveted thereto, to form a rigid skeleton framework. This frame is provided with a transverse pin 22 and transverse guides 23 and 24. The rack bar 25 is sildably guided in the cross-bars 23 and 24. This rack meshes with the teeth of the segment 26 pivoted on the transverse shaft 27, journaled in bearings 28 and 29. The longitudinal movement of the rack bar 25 is multiplied by a succession of cross pivoted levers forming a lazy tongs 30. The levers 31 and 32 are fulcrumed on the transverse pin 22 to form a fixed point from which the lazy tongs operate. The ends of these levers are connected by the pivotal links 33 and 34 engaging the pivot 35 in the end of the rack bar 25.

The index hand 36 is pivotally attached at 37 to the opposite end of the lazy tongs by which it is extended from and retracted into the casing.

The shaft 27 may be oscillated in any suitable manner, such as by a series of interconnected bell cranks or by the pulley 38 fixed thereon outside the inclosing casing side wall 2. A similar pulley 39 may be mounted adjacent the driver's seat, or other convenient position on the vehicle body. This pulley is provided with the operating handle 41. These pulleys are caused to operate in unison by the endless flexible cable 42 fixed thereto and adapted to transmit the oscillation of the pulley 39 to the pulley 38. The same effect could be accomplished by means of a flexible wire, extending through a tube fixed to the body of the vehicle with the opposite end of the wire fixed to the handle 41 and a crank on the shaft respectively in accordance with common practice.

When the handle 41 is moved up or down the motion is transmitted through the cable belt 42 to the shaft 27, the rotation of which moves the rack bar 25 back and forth to extend or retract the index 36 from the casing. When the index is extended, the door 7 is swung out of its path by the impingement of the cam 43 on the end of the lever 44, that is pivoted to the hoop 11 at 45. The opposite end of this lever is pivoted at 46 to the connecting rod 47, that is pivoted at 48 to the arm 49 that is fixed on the shaft 27. The fulcrum 45 being adjacent to the hinge 8 of the door 7, the latter is swung open synchronously with the advance of the index as shown in Fig. 2.

To attract attention to the index, I have added the alarm bell 49' fixed to the frame in the circuit 50 with the battery 51. This circuit included the contacts 52 and 53 that are normally open when the index is retracting, but are forced into contact with each other by the lug 54 on the segment on the latter retracts in extending the index forward, thus closing the circuit 50 permitting current to flow through the battery through the magnets to cause vibratory sounding of the bell 49 in the usual manner. It is my intention to provide bells of unique and uniform tone so that their tone will become associated with the operation of this traffic signal.

For use at night I have provided the index with the electric bulbs 51' and 52' wired in multiple with the bell circuit 50, so that the lights 51' and 52' will illuminate the index when the circuit 50 is closed to ring the bell 49' as described. To cut out the lights 51' and 52' I introduce the switch shown in Figs. 7—8 in which the terminals 53' and 54' are connected by the contactor 55 fixed in the pivot 56 having the squared end 57 to receive a key insertible through the key hole 58 in the casing whereby this switch may be opened or closed at the will of the operator.

Having thus described this invention, what I claim and desire to secure by Letters Patent is:—

1. A traffic signal comprising a casing having a door pivotally mounted over an end thereof; an independent frame member mounted in said casing; a "lazy tongs" having a portion thereof pivotally connected to said frame and an index signal fixed on an end of said "lazy tongs"; and rack and segment means secured to said frame for moving said "lazy tongs" into the extended position through said door or retracted position within said casing.

2. A traffic signal comprising a casing having a door pivotally mounted over an end thereof; an independent frame member mounted in said casing; a "lazy tongs" having a portion thereof pivotally connected to said frame and an index signal fixed on an end of said "lazy tongs"; rack and segment means secured to said frame for moving said "lazy tongs" into the extended position through said door or retracted position within said casing; and means independent of said "lazy tongs" for opening and closing said door synchronously with the operation of said tongs.

In testimony whereof, I have hereunto set my hand at San Francisco, California, this 6th day of February, 1920.

ELI A. SUTZ.

In presence of—
LINCOLN V. JOHNSON.